United States Patent
Wear et al.

(10) Patent No.: US 7,196,332 B2
(45) Date of Patent: Mar. 27, 2007

(54) MONOLITHIC X-RAY DETECTOR WITH STAGGERED DETECTION AREAS

(75) Inventors: James A. Wear, Madison, WI (US); Robert A. Washenko, Madison, WI (US); Randall K. Payne, Madison, WI (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 10/838,892

(22) Filed: May 4, 2004

(65) Prior Publication Data

US 2005/0247882 A1 Nov. 10, 2005

(51) Int. Cl.
*G01T 1/24* (2006.01)
*H01L 27/146* (2006.01)

(52) U.S. Cl. .................... 250/370.01; 250/370.12; 250/370.13

(58) Field of Classification Search ........... 250/370.01, 250/370.12, 370.13
See application file for complete search history.

(56) References Cited

U.S. PATENT DOCUMENTS

| | | | | |
|---|---|---|---|---|
| 5,021,663 A | * | 6/1991 | Hornbeck | 250/349 |
| 5,436,458 A | * | 7/1995 | Tran et al. | 250/370.09 |
| 5,666,395 A | * | 9/1997 | Tsukamoto et al. | 378/98.4 |
| 5,677,539 A | * | 10/1997 | Apotovsky et al. | 250/370.13 |
| 5,841,832 A | | 11/1998 | Mazess et al. | |
| 5,841,833 A | | 11/1998 | Mazess et al. | |
| 5,889,313 A | * | 3/1999 | Parker | 257/429 |
| 6,037,595 A | | 3/2000 | Lingren | |
| 6,410,922 B1 | * | 6/2002 | Spartiotis et al. | 250/370.09 |

* cited by examiner

*Primary Examiner*—David Porta
*Assistant Examiner*—Mindy Vu
(74) *Attorney, Agent, or Firm*—Quarles & Brady LLP

(57) ABSTRACT

A monolithic solid-state detector using a staggered arrangement of pixels in multiple rows improves spatial resolution without requiring reduction in pixel size. Parallelogram shapes of CZT monolith allow tiling in one dimension without inefficient zones between monoliths. A scanning device using linear array of detectors with non-rectangular shape and staggered rows of detection elements such that no dead zones occur within a scan field.

21 Claims, 2 Drawing Sheets

MONOLITHIC X-RAY DETECTOR WITH STAGGERED DETECTION AREAS

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates generally to x-ray detectors, and in particular, to a cadmium zinc telluride (CZT) detector used for quantitative x-ray imaging.

Measurements of the x-ray absorption by an object at two different x-ray energies can reveal information about the composition of that object as decomposed into two selected basis materials. In the medical area, the selected basis materials are frequently bone and soft tissue. The ability to distinguish bone from surrounding soft tissue allows x-ray images to yield quantitative information about in vivo bone density for the diagnosis of osteoporosis and other bone disease.

Selecting different selected basis materials allows dual energy x-ray measurements to be used for other purposes. For example, dual energy x-ray measurements can be used for the analysis of body composition by distinguishing between fat and lean tissue, or for baggage scanning by distinguishing between explosive and non-explosive materials.

Cadmium zinc telluride (CZT) detectors may be used to measure x-rays passing through a measured object in dual energy x-ray systems. Such CZT detectors release an electrical charge for each incident photon proportional to the photon energy and thus allow separate measurement of high and low energy x-rays as sorted by pulse height.

Generally, a CZT detector employs a number of separate crystals of CZT, each having a front and rear surface electrode to detect x-rays within a pixel defined by the area of the crystal. Constructing a CZT detector requires the assembly of many separate CZT crystals which can be difficult. High-resolution detectors having smaller pixel sizes require smaller crystals, exacerbating the problem of assembly.

SUMMARY OF THE INVENTION

The present invention provides a high resolution CZT detector constructed of a monolithic crystal of CZT having multiple electrodes placed on one face to define multiple pixels. The monolithic design eliminates the assembly problems caused by the use of many separate small crystals. However, regions between pixels are known to be inefficient when counting x-rays absorbed between adjacent pixels ("gutter" regions) due to mutual sharing of deposited charge. Additionally in slot-scanning applications it is more efficient to cover a significant area by use of an extended linear array of monoliths. This necessarily implies that multiple crystals must be butted against each other end-to-end resulting in dead zones between crystals. For these reasons, the present invention has multiple rows of staggered pixels on each crystal. Scanning using staggered rows of pixels allows subsequent rows of detector elements to cover inefficient regions of previous rows. To enable tiling of multiple monolithic elements, without interruption of pixel pitch along rows or loss of efficiency due to gaps between monoliths, monoliths are fabricated into parallelogram shapes.

These particular features, objects and advantages may apply to only some embodiments falling within the claims and thus do not define the scope of the invention.

BRIEF DESCRIPTION OF THE DRAWINGS

FIG. 1 also shows the detection circuitry used for initialization of the bias on the monolithic detector and for interpolation within the defined pixels;

DETAILED DESCRIPTION OF THE PREFERRED EMBODIMENT

Figure 1:
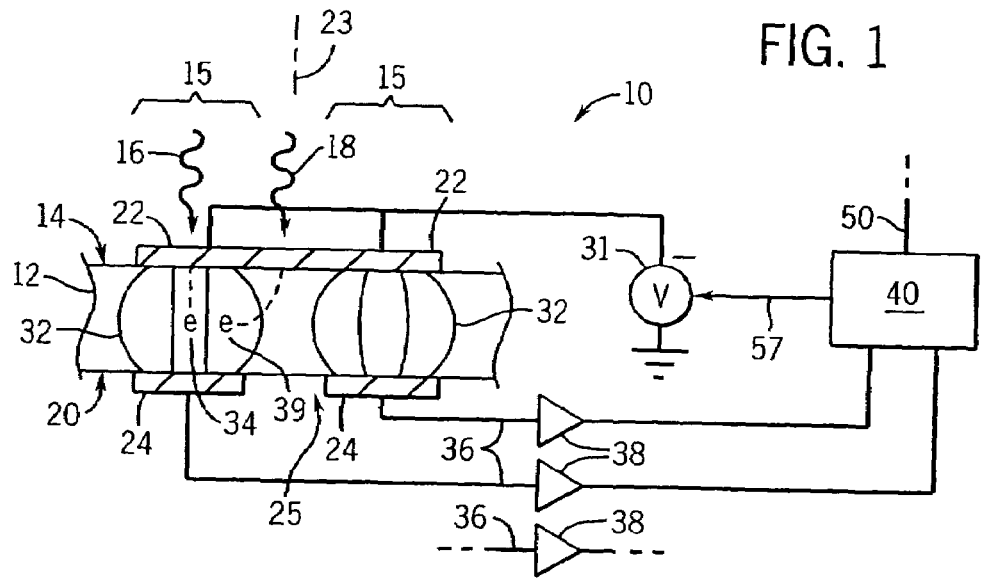
FIG. 1 is a cross-sectional view of a monolithic CZT detector according to the present invention showing charge carrier migration from the gutter regions into adjacent pixel regions.

Referring now to FIG. 1, a solid-state, dual energy x-ray detector system 10 may include a monolithic CZT crystal 12 having a front surface 14 normally facing a source of x-ray photons 16 and 18 and a rear surface 20 on the opposite side of the CZT crystal from the front surface. Alternatively, other detector materials such as CdTe and $HgI_2$ may be used.

A cathode 22 is applied to the front surface 14 of the CZT crystal 12, and an anode 24 is applied to the rear surface 20 of the CZT crystal 12 to provide a biasing electrical field between them. Generally, the cathode 22 will cover the entire front surface 14, but the anode will cover only a small area centered on the rear surface 20. Both the cathode 22 and anode 24 may be applied directly to the CZT crystal 12, for example, by sputtering, and are preferably formed of a conductive metal such as platinum. The front surface 14 of the CZT crystal 12 may also be protected by a light-opaque, x-ray transparent material such as aluminized Mylar.

The anodes 24 are separated by a gutter region 25. In one embodiment of the invention, the anodes 24 are approximately 1.5 by 2.5 millimeters in area and the gutter regions 25 are approximately 150–200 microns wide. The gutter regions 25 serve to electrically isolate the anodes 24 to permit independent measurement of bursts of charge released between the cathode 22 on front surface 14 and the anodes 24 on the rear surface 20 along axis 23 for each pixel region 15. Weak electric fields in this inter-pixel (gutter) region are responsible for inefficient charge collection. Although the preferred embodiment may use steering electrodes (not shown), there is always a region (typically 0.1–0.2 mm) in which charge is split between two pixels, due to the finite width of charge deposition created by x-ray absorption.

To promote efficient collection of charge deposited in the crystal 12, a bias voltage from bias voltage source 31 is applied across the opposed cathode 22 and anodes 24 of each pixel region 15 producing an electrical field 32. X-ray photons 16 passing through cathode 22 on the front surface 14 enter the monolithic crystal 12 to liberate charge carriers 34 (shown here as electrons) which are then collected by anodes 24 on the rear surface 20 and conducted via separate leads 36 for each pixel region 15 to a ground referenced charge integrator 38. The amount of charge liberated by each photon 16 is indicative of the energy of the x-ray photon 16. Outputs from the charge integrators 38 are received by a processing computer 40 that may produce a quantitative image of the x-ray photons 16 according to techniques well known in the art.

In contrast to x-ray photons 16 striking within the pixel regions 15, x-ray photons 18 passing into the monolithic crystal 12 at gutter region 25 will produce charge carriers 39 that may migrate into a pixel region 15 to be collected by anode 24 on the rear surface 20. These charge carriers 39 degrade the quantitative accuracy and spatial resolution of a monolithically designed detector system 10, adding an effective noise component to the charge collected from x-ray photons 16.

Figure 2:
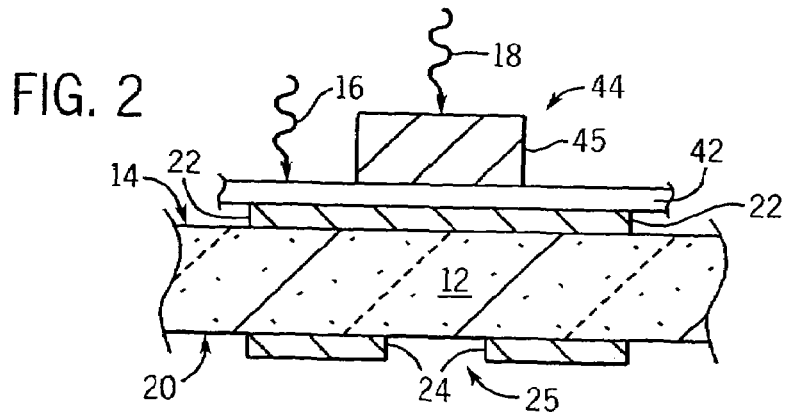
FIG. 2 is a top planar view of the rear surface of a monolithic CZT detector showing the placement of the steering electrodes in a grid pattern and showing the location of the anodes in a staggered parallelogram configuration for improved sampling in a scanning x-ray machine.

Referring now also to FIG. 2, generally the x-ray detector system 10 may provide for multiple detector elements on a single CZT crystal 12. In this case, multiple anodes 24 will be placed on the CZT crystal 12, each surrounded by steering electrodes 30, may be interconnected and covered by a single cathode 22.

The steering electrodes 30 surrounding each anode 24 describe by their perimeter a pixel region 15. The pixel regions 15 describe areas which may independently detect x-ray photons 16 to produce a quantitative detection value that will be mapped to individual pixels in a resultant image.

In the embodiment shown in FIG. 2, the pixel regions 15 are generally parallelograms tiling in rows and slanted columns. In this embodiment, each parallelogram pixel region 15 has a first base 52 generally perpendicular to a scan direction 54 in which the x-ray detector system 10 will be scanned to collect information over an area of the patient. Sidewalls 56 of the parallelogram and the pixel regions 15 are angled such that the centers of the pixel regions 15 defined approximately by the center of the anode 24 for a first row of pixel regions 15, follow paths 60 that interleave with paths 62 followed by centers of the pixel regions 15 of a second row of pixel regions 15. In this way, larger pixel regions 15 may provide higher spatial resolution sampling to improve the resultant image. Further the data lost from the gutter areas in one row are regained in the next staggered row.

Figure 3:
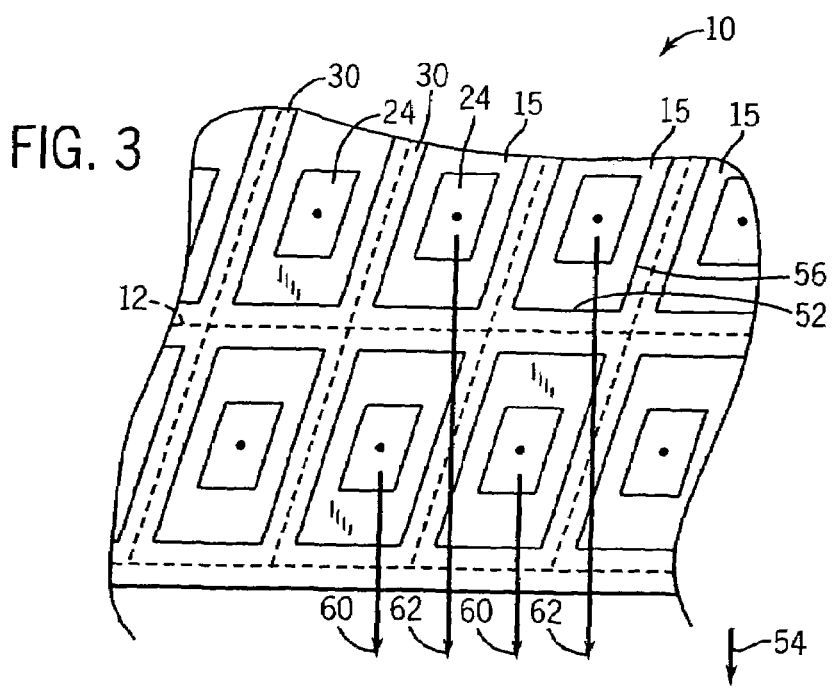
FIG. 3 is a figure similar to that of FIG. 2 showing an alternative staggered configuration of electrodes using rectangular detector elements.
Figure 4:
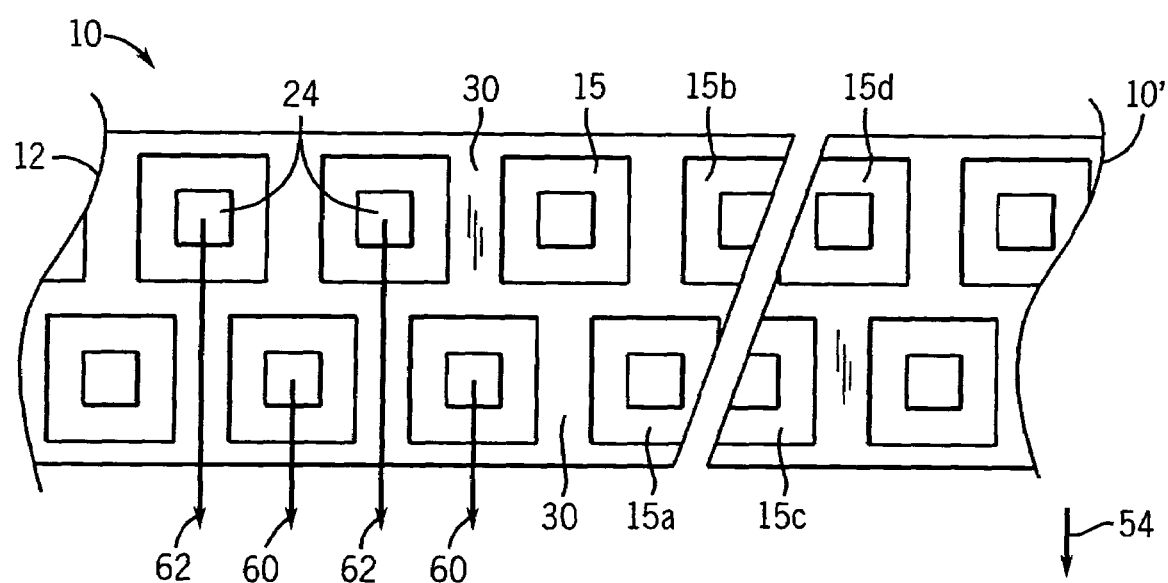

Referring now to FIG. 3, in an alternative embodiment, the pixel regions 15 may be rectangular with the pixel regions 15 of a first row staggered with respect to the second row to provide interleaved paths 60 and 62 as before. The rectangular pixel regions 15 of FIG. 2 provide the advantage of a more compact detection region limiting the effective size of a convolution kernel (a function of the project width of the pixel regions 15 on a line perpendicular to the scan direction 54) that can make a resultant image less distinct.

Referring still to FIG. 3, a convenient form factor for the x-ray detector system 10 has two rows each having eight pixel regions 15. Multiple detector systems 10 of this or similar form factors may be ganged edgewise to provide arbitrary continuations of the rows. For an x-ray detector system 10 having rectangular pixel regions 15, pixel regions 15a and 15b at a first and second row of a right edge of the x-ray detector system 10 may be cut at an angle with respect to the scan direction 54 to equally reduce the area of the pixel regions 15a and 15b. Similarly reduced pixel regions 15c and 15d at a first and second row of a left edge of a next x-ray detector system 10' may be placed in close proximity to their counterpart pixel regions 15b and 15a. The area of each pixel region 15a–d is reduced by half the width of the joint gap between x-ray detector system 10 and 10', which then preserves the regular lateral of the other pixel regions 15. In another embodiment, the area of each pixel region 15a–15d is reduced to slightly less than half to accommodate the joint gap between x-ray detector system 10 and 10'. This provides two virtual pixel regions, the first being a combination of the signals from pixel regions 15a and 15d, and the second being a combination of the pixel regions 15b and 15c. The slightly reduced detection area of these detectors' virtual pixel regions may be corrected mathematically by a weighting factor applied by the computer receiving the signals.

The present invention is applicable not only to polygonal electrode regions, but other shapes as well.

It is specifically intended that the present invention not be limited to the embodiments and illustrations contained herein, but include modified forms of those embodiments including portions of the embodiments and combinations of elements of different embodiments as come within the scope of the following claims.

We claim:

1. A solid-state x-ray detector comprising:
   a monolithic detector element having a front and rear surface;
   at least one electrode on the front surface;
   at least two rows of electrodes positioned on the rear surface, each row defining independent detection regions displaced along an axis, wherein centers of the detection regions of different rows are offset with respect to each other as measured along the rows;
   wherein the independent detection regions have perimeters describing parallelograms;
   wherein at least one end of the monolithic detector element at an end of the rows is parallel to a side of the parallelograms; and
   whereby multiple monolithic detector elements may be arranged end to end to extend the rows of detector regions without substantial gap or change in a center to center spacing of the detector elements.

2. The solid-state x-ray detector of claim 1 wherein the offset is one half a width of a detector region along the axis.

3. The solid state x-ray detector of claim 1 wherein an area of detection regions at ends of the rows are less than an area of detector regions not at the ends of the rows;
   whereby multiple monolithic detector elements may be arranged end to end to extend the rows of detector regions without changing center to center spacing of the detector regions.

4. The solid-state x-ray detector of claim 3 wherein the detector element at ends of the rows is cut at an angle with respect to the rows to have a trapezoidal shaped perimeter.

5. The solid-state x-ray detector of claim 1 further including a readout circuit reading independent currents from each of the electrodes.

6. The solid-state x-ray detector of claim 1 further including x-ray masking elements are positioned at interfaces between detector regions.

7. The solid-state x-ray detector of claim 1 wherein the detector element is selected from the group consisting of: CZT, CdTe and $HgI_2$.

8. A solid-state x-ray detector comprising:
   a monolithic x-ray detector element having a front and rear surface;
   at least one electrode on the front surface;
   at least two rows of electrodes positioned on the rear surface, each row defining parallelogram-shaped perimeters enclosing detection regions displaced along an axis, wherein the electrodes on the rear surface are electrically separated by gutter regions;

wherein centers of the detection regions of different rows are offset with respect to each other as measured along the rows;

whereby during an x-ray acquisition, x-rays falling within the gutter regions of a first row, fall in non-gutter regions in a second row as the solid-state x-ray detector is swept along a path perpendicular to the rows; and;

further including an x-ray blocking mask having openings aligned with the electrodes on the rear surface and blocking elements aligned with the gutter regions to block x-rays in at least a portion of the gutter regions.

9. The solid-state x-ray detector of claim 8 wherein the offset is one half a width of a detector region along the axis.

10. The solid state x-ray detector of claim 8 wherein at least one end of the monolithic detector element at an end of the rows is parallel to sides of the parallelograms; and whereby multiple monolithic detector elements may be arranged end to end to extend the rows of detector regions without substantial gap or change in a center to center spacing of the detector elements.

11. The solid-state x-ray detector of claim 8 wherein the independent detection regions have perimeters describing rectangles.

12. The solid state x-ray detector of claim 11 wherein an area of detection regions at ends of the rows is less than an area of detector regions not at the ends of the rows;

whereby multiple monolithic detector elements may be arranged end to end to extend the rows of detector regions without changing center to center spacing of the detector regions.

13. The solid-state x-ray detector of claim 11 wherein the detector element at ends of the rows is cut at an angle with respect to the rows to have a trapezoidal shaped perimeter.

14. The solid-state x-ray detector of claim 8 further including a readout circuit reading independent currents from each of the electrically separated electrodes.

15. The solid-state x-ray detector of claim 8 further including x-ray masking elements are positioned at interfaces between detector regions.

16. A solid-state x-ray detector comprising:

a monolithic detector element having a front and rear surface;

at least one electrode on the front surface;

at least two rows of electrodes positioned on the rear surface, each row defining independent detection regions displaced along an axis, wherein centers of the detection regions of different rows are offset with respect to each other as measured along the rows;

wherein the independent detection regions have perimeters forming rectangles arranged in rows;

wherein the independent detection regions have perimeters describing parallelograms;

wherein at least one end of the monolithic detector element at an end of the rows is parallel to a side of the parallelograms; and whereby multiple monolithic detector elements may be arranged end to end to extend the rows of detector regions without substantial gap or change in a center to center spacing of the detector elements.

17. A solid-state x-ray detector comprising:

a monolithic detector element having a front and rear surface;

at least one electrode on the front surface;

at least two rows of electrodes positioned on the rear surface, each row defining independent detection regions displaced along an axis, wherein centers of the detection regions of different rows are offset with respect to each other as measured along the rows;

wherein the independent detection regions have perimeters describing rectangles;

wherein an area of detection regions at ends of the rows are less than an area of detector regions not at the ends of the rows;

whereby multiple monolithic detector elements may be arranged end to end to extend the rows of detector regions without changing center to center spacing of the detector regions; and wherein the detector element at ends of the rows is cut at an angle with respect to the rows to have a trapezoidal shaped perimeter.

18. A solid-state x-ray detector comprising:

a monolithic x-ray detector element having a front and rear surface;

at least one electrode on the front surface;

at least two rows of electrodes positioned on the rear surface, each row defining detection regions displaced along an axis, wherein the electrodes on the rear surface are electrically separated by gutter regions: wherein centers of the detection regions of different rows are offset with respect to each other as measured along the rows;

whereby during an x-ray acquisition, x-rays falling within the gutter regions of a first row, fall in non-gutter regions in a second row as the solid-state x-ray detector is swept along a path perpendicular to the rows; and further including an x-ray blocking mask having openings aligned with the electrodes on the rear surface and blocking elements aligned with the gutter regions to block x-rays in at least a portion of the gutter regions.

19. A solid-state x-ray detector comprising:

a monolithic detector element having a front and rear surface;

at least one electrode on the front surface;

at least two rows of electrodes positioned on the rear surface, each row defining detection regions displaced along an axis, wherein the electrodes on the rear surface are electrically separated by gutter regions; wherein centers of the detection regions of different rows are offset with respect to each other as measured along the rows;

whereby during an x-ray acquisition, x-rays falling within the gutter regions of a first row, fall in non-gutter regions in a second row as the solid-state x-ray detector is swept along a path perpendicular to the rows;

wherein the independent detection regions have perimeters describing rectangles;

wherein an area of detection regions at ends of the rows is less than an area of detector regions not at the ends of the rows;

whereby multiple monolithic detector elements may be arranged end to end to extend the rows of detector regions without changing center to center spacing of the detector regions; and wherein the detector element at ends of the rows is cut at an angle with respect to the rows to have a trapezoidal shaped perimeter.

20. A solid-state x-ray detector comprising:

a monolithic detector element having a front and rear surface;

at least one electrode on the front surface;

at least two rows of electrodes positioned on the rear surface, each row defining independent detection regions displaced along an axis, wherein centers of the detection regions of different rows are offset with respect to each other as measured along the rows;

wherein the independent detection regions have perimeters forming rectangles arranged in rows;

wherein an area of detection regions at ends of the rows are less than an area of detector regions not at the ends of the rows;

whereby multiple monolithic detector elements may be arranged end to end to extend the rows of detector regions without changing center to center spacing of the detector regions; and wherein the detector element at ends of the rows is cut at an angle with respect to the rows to have a trapezoidal shaped perimeter.

21. A solid-state x-ray detector comprising:

a monolithic x-ray detector element having a front and rear surface;

at least one electrode on the front surface;

at least two rows of electrodes positioned on the rear surface, each row defining parallelogram-shaped perimeters enclosing detection regions displaced along an axis, wherein the electrodes on the rear surface are electrically separated by gutter regions;

wherein centers of the detection regions of different rows are offset with respect to each other as measured along the rows;

whereby during an x-ray acquisition, x-rays falling within the gutter regions of a first row, fall in non-gutter regions in a second row as the solid-state x-ray detector is swept along a path perpendicular to the rows;

wherein at least one end of the monolithic detector element at an end of the rows is parallel to sides of the parallelograms; and whereby multiple monolithic detector elements may be arranged end to end to extend the rows of detector regions without substantial gap or change in a center to center spacing of the detector elements.

* * * * *